(12) United States Patent
Karlsson et al.

(10) Patent No.: US 12,071,018 B2
(45) Date of Patent: Aug. 27, 2024

(54) POWERTRAIN FOR A VEHICLE AND A VEHICLE CONSISTING THE POWERTRAIN

(71) Applicant: Scania CV AB, Södertälje (SE)

(72) Inventors: Stefan Karlsson, Stallarholmen (SE); Jörgen Forsberg, Mariefred (SE); Tomas Löfwall, Årsta (SE); Christian Ness, Nykvarn (SE)

(73) Assignee: Scania CV AB, Södertälje (SE)

( * ) Notice: Subject to any disclaimer, the term of this patent is extended or adjusted under 35 U.S.C. 154(b) by 352 days.

(21) Appl. No.: 17/435,686

(22) PCT Filed: Feb. 12, 2020

(86) PCT No.: PCT/SE2020/050147
§ 371 (c)(1),
(2) Date: Sep. 1, 2021

(87) PCT Pub. No.: WO2020/185139
PCT Pub. Date: Sep. 17, 2020

(65) Prior Publication Data
US 2022/0153120 A1 May 19, 2022

(30) Foreign Application Priority Data
Mar. 8, 2019 (SE) .................... 1950296-2

(51) Int. Cl.
*B60K 6/24* (2007.10)
*B60K 6/26* (2007.10)
(Continued)

(52) U.S. Cl.
CPC .................. *B60K 6/48* (2013.01); *B60K 6/24* (2013.01); *B60K 6/26* (2013.01); *B60K 6/36* (2013.01);
(Continued)

(58) Field of Classification Search
CPC ... B60K 6/48; B60K 6/24; B60K 6/26; B60K 6/36; B60K 6/40; B60K 17/22; B60K 2006/4825; B60Y 2200/92
See application file for complete search history.

(56) References Cited

U.S. PATENT DOCUMENTS

| 8,991,528 B2 | 3/2015 | Hellholm et al. |
| 10,723,211 B2 | 7/2020 | Mastrandrea |

(Continued)

FOREIGN PATENT DOCUMENTS

| CN | 107791861 A | 3/2018 |
| DE | 102010017966 A1 | 10/2011 |

(Continued)

OTHER PUBLICATIONS

Scania CV AB, European Patent Application No. 20768938.1, Extended European Search Report, Nov. 15, 2022.

(Continued)

*Primary Examiner* — Jason D Shanske
*Assistant Examiner* — James J Triggs
(74) *Attorney, Agent, or Firm* — Moore & Van Allen PLLC; W. Kevin Ransom

(57) ABSTRACT

The invention relates to a powertrain for a vehicle. The powertrain comprising: at least one propulsion unit; a transmission connected to the at least one propulsion unit; a propeller shaft connected to the transmission, and at least one drive shaft of a rear axle, which at least one drive shaft is connected to the propeller shaft, so that the propeller shaft extends between the transmission and the at least one drive shaft. The at least one propulsion unit is arranged in a position between the transmission and the rear axle in a longitudinal direction of the vehicle. The invention also relates to a vehicle.

21 Claims, 3 Drawing Sheets

(51) Int. Cl.
*B60K 6/36* (2007.10)
*B60K 6/40* (2007.10)
*B60K 6/48* (2007.10)
*B60K 17/22* (2006.01)

(52) U.S. Cl.
CPC ............... *B60K 6/40* (2013.01); *B60K 17/22* (2013.01); *B60K 2006/4825* (2013.01); *B60Y 2200/92* (2013.01)

(56) References Cited

U.S. PATENT DOCUMENTS

| | | |
|---|---|---|
| 2002/0036106 A1 | 3/2002 | Hanyu et al. |
| 2004/0014371 A1 | 1/2004 | Gibbs |
| 2007/0175681 A1* | 8/2007 | King ................. B60K 6/26 903/906 |
| 2010/0263958 A1 | 10/2010 | Kochidomari et al. |
| 2011/0259657 A1 | 10/2011 | Fuechtner |
| 2017/0008507 A1 | 1/2017 | Shukla et al. |
| 2017/0363408 A1 | 12/2017 | Degner et al. |
| 2018/0201144 A1 | 7/2018 | Newman |
| 2018/0340568 A1 | 11/2018 | Mikazuki et al. |
| 2020/0247224 A1 | 8/2020 | Ito et al. |

FOREIGN PATENT DOCUMENTS

| | | |
|---|---|---|
| EP | 1031452 A2 | 8/2000 |
| EP | 3323652 A1 | 5/2018 |
| SE | 0950530 A1 | 1/2011 |
| WO | 2019021965 A1 | 1/2019 |

OTHER PUBLICATIONS

Scania CV AB, International Patent Application No. PCT/SE2020/050147, International Search Report, Apr. 9, 2020.
Scania CV AB, International Patent Application No. PCT/SE2020/050147, Written Opinion, Apr. 9, 2020.
Scania CV AB, Swedish Patent Application No. 1950296-2, Office Action, Sep. 4, 2019.
Scania CV AB, International Patent Application No. PCT/SE2020/050147, International Preliminary Report on Patentability, Aug. 25, 2021.
Scania CV AB, Chinese Patent Application No. 202080012484.5, First Office Action, May 27, 2024.

* cited by examiner

POWERTRAIN FOR A VEHICLE AND A VEHICLE CONSISTING THE POWERTRAIN

CROSS-REFERENCE TO RELATED APPLICATIONS

This application is a National Stage Patent Application (filed under 35 § U.S.C. 371) of PCT/SE2020/050147, filed Feb. 12, 2020 of the same title, which, in turn claims priority to Swedish Patent Application No. 1950296-2 filed Mar. 8, 2019 of the same title; the contents of each of which are hereby incorporated by reference.

FIELD OF THE INVENTION

The invention relates to a powertrain for a vehicle according to the appended claims. The invention further relates to a vehicle according to the appended claims.

BACKGROUND OF THE INVENTION

Depending on the type of propulsion unit in a power train, different types of fuel or power should be supplied to the propulsion unit. If the propulsion unit is an electrical machine, the electrical machine should be supplied with electrical power. If the propulsion unit is an internal combustion engine, the internal combustion engine should be supplied with fuel, such as diesel fuel or petrol. When a vehicle is provided with the powertrain, the propulsion unit may comprise an electrical machine and/or an internal combustion engine.

The operating range of the vehicle may be extended if the fuel or electric power supply of the vehicle is large. Fuel is stored in energy storage units, such as fuel tanks of the vehicle. Electrical power is stored in energy storage units of the vehicle. The energy storage units are arranged on the vehicle, so that they do not end up in conflict with other components on the vehicle.

There are electric vehicles, which comprises receiving portions for energy storage units on side portions of the vehicle and between front and rear wheels.

SUMMARY OF THE INVENTION

A vehicle, which only propulsion unit is an electrical machine, the storage of energy storage units and the capacity of the energy storage units are critical for the operation range of the vehicle. A large energy storage unit or a number of small energy storage units require space in the vehicle. In addition, a vehicle comprises components such as shafts, frames, and components in the powertrain, which restrict the possibility to arrange large energy storage units on the vehicle. If the propulsion unit also comprises an internal combustion engine, additional storage of fuel in the energy storage unit, such as a fuel tank is required. Arranging a conventional powertrain rearwards in the vehicle in a direction towards a rear axle for rear drive wheels of the vehicle may not satisfactory create more space in front of the propulsion unit. Since the length of a propeller shaft of the powertrain will decrease to a critical length and joint angles will exceed the maximum allowable angle both in normal driving position and at rear axle movements when arranging the conventional powertrain rearwards, the space in front of the powertrain and behind the front axle will be restricted.

Therefore, it is desired to arrange a powertrain for a vehicle in a position that a space is created for accommodating energy storage units. Further, it is desired to arrange a propulsion unit of a powertrain in a position that allows the propeller shaft to move within allowable angles both in normal driving position and at rear axle movements.

An object of the invention is therefore to arrange a powertrain for a vehicle in a position that a space is created for accommodating energy storage units.

A further object of the invention is to arrange a propulsion unit of a powertrain in a position that allows the propeller shaft to move within allowable angles both in normal driving position and at rear axle movements.

A further object of the invention is to arrange a propulsion unit of a powertrain in a position that allows the propeller shaft to move within allowable angles for different vehicle configurations.

The herein mentioned objects are achieved with a powertrain for a vehicle according to the appended claims. The herein mentioned objects are also achieved with a vehicle according to the appended claims.

According to an aspect of the invention, a powertrain for a vehicle is provided. The powertrain comprising: at least one propulsion unit; a transmission connected to the at least one propulsion unit; a propeller shaft connected to the transmission, and at least one drive shaft of a rear axle, which at least one drive shaft is connected to the propeller shaft, so that the propeller shaft extends between the transmission and the at least one drive shaft, wherein the at least one propulsion unit is arranged in a position between the transmission and the rear axle in a longitudinal direction of the vehicle.

According to a further aspect of the invention, a vehicle is provided. The vehicle, comprising the powertrain disclosed herein.

By arranging such a powertrain in a position in the vehicle, a space is created for accommodating energy storage units for electric power and/or fuel in the vehicle. Further, by arranging such a propulsion unit of a powertrain in a position in the vehicle, allows the propeller shaft to move within allowable angles both in normal driving position and at rear axle movements.

The powertrain may use only electrical machines as a propulsion unit. Since a space is created for accommodating energy storage units in the vehicle, the storage and the capacity of electrical power for propulsion of the electrical machines increase the operation range of the vehicle. The created space in the vehicle may accommodate a large energy storage unit or a number of small energy storage units. Vehicle components such as shafts, frames, and components in the powertrain will be arranged outside the created space for the energy storage units. If the propulsion unit also comprises an internal combustion engine, the accommodation of an energy storage unit for fuel is possible in the created space in the vehicle. The length of a propeller shaft of the powertrain will be enough for handle maximum allowable angles both in normal driving position and at rear axle movements. Also joint angles will fall within allowable angels for universal joints between the propeller shaft and the transmission and the drive shaft. Thus, by arranging the at least one propulsion unit in a position between the transmission and the rear axle in the longitudinal direction of the vehicle will create an essential space in front of the powertrain. Further, when arranging the powertrain rearwards in the vehicle in a direction towards rear axle of the vehicle, the created space in front of the powertrain will be even larger. Further, to realize a form factor of the propulsion unit, where several internal components, such as the propulsion unit, arranged in parallel with propeller shaft, reduces the unit longitude length and give even more space in front of the powertrain.

Additional objectives, advantages and novel features of the invention will be apparent to one skilled in the art from the following details, and through exercising the invention. While the invention is described below, it should be apparent that the invention may not be limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which.

DETAILED DESCRIPTION

Figure 1:
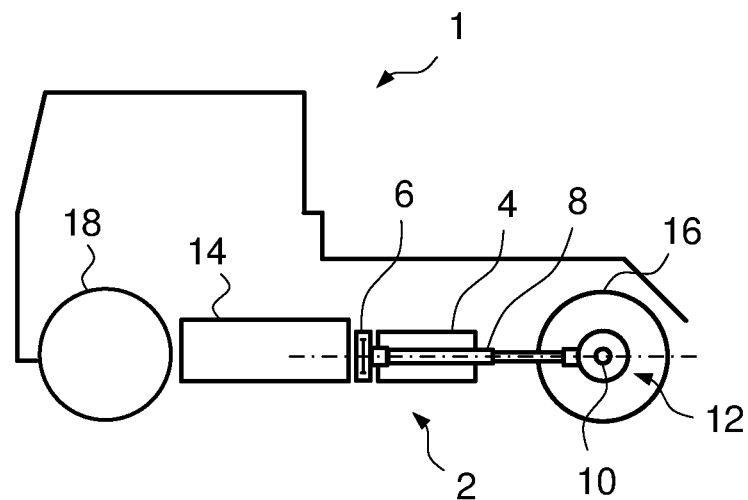
FIG. 1 schematically illustrates a side view of a vehicle with a powertrain according to an example.

The powertrain according to the present disclosure may be arranged in a position in a vehicle such that a space is created for accommodating energy storage units in the vehicle. Further, a propulsion unit of the powertrain according to the present disclosure may be arranged in a position in the vehicle, so that the propeller shaft is allowed to move within allowable angles both in normal driving position and at rear axle movements.

According to the present disclosure, a powertrain for a vehicle is provided. The powertrain comprising at least one propulsion unit, a transmission connected to the at least one propulsion unit, a propeller shaft connected to the transmission, and at least one drive shaft of a rear axle. The at least one drive shaft is connected to the propeller shaft, so that the propeller shaft extends between the transmission and the at least one drive shaft. The at least one propulsion unit is arranged in a position between the transmission and the rear axle in a longitudinal direction of the vehicle.

The powertrain in the vehicle transfers power from the propulsion unit to drive wheels of the vehicle. The vehicle may be a heavy vehicle, e.g. a truck or a bus. The vehicle may alternatively be a passenger car. The vehicle may be driven by a driver. The vehicle may be remotely operated or autonomously operated. The drive wheels may be arranged in a rear part of the vehicle or in a front part of the vehicle. All wheels of the vehicle may be drive wheels. The propulsion unit may comprise one or several electrical machines. Alternatively, the propulsion unit may be an internal combustion engine. It is also possible to combine one or several electrical machines with an internal combustion engine in the powertrain. Such combination may allow the electrical machines and the internal combustion engine to work independently of each other or to work in combination as a hybrid drive.

The transmission may be a gearbox, comprising gear wheels for transferring torque and gear ratio. The transmission may be a gearbox, comprising a chain or a belt transmission for transferring torque and gear ratio. The gear ratio over the transmission may be fixed or variable. The gear ration may be 1:1. The gearbox may be an automatic or a manual transmission. The gearbox may be an automatic-manual-transmission, such as an AMT gearbox.

The propeller shaft is configured to transfer rotational motion and torque between the transmission and the at least one drive shaft of the rear axle. The propeller shaft is with a first end connected to an output shaft of the transmission and with a second end connected to the at least one drive shaft. The second end of the propeller shaft may be connected to the at least one drive shaft via a differential gear, which is arranged in the rear axle. The differential gear comprises an input shaft, which is connected to the propeller shaft, and two output shafts, each connected to a drive shaft. Each drive shaft is connected to a drive wheel, for driving the vehicle. The at least one drive shaft is configured to transfer rotational motion and torque between the propeller shaft and the drive wheel. The propeller shaft may have an extension in the same direction as the extension of the output shaft of the transmission and the extension of the input shaft of the differential gear. However, the propeller shaft may have an extension in another direction than the extension of the output shaft of the transmission and the extension of the input shaft of the differential gear. The rear axle may have an extension from one rear drive wheel at one side of the vehicle to another drive wheel on the other side of the vehicle. The vehicle may comprise a frame. The powertrain may be connected or attached to the frame. Thus, the propulsion unit, transmission, and the rear axle may be connected or attached to the frame. The rear axle may be connected to the frame by means of a suspension, which allows the rear axle to move in a vertical direction in relation to the extension of the frame.

The at least one propulsion unit is arranged in a position between the transmission and the rear axle in a longitudinal direction of the vehicle. The transmission may be a gearbox. Thus, the at least one propulsion unit is arranged in a position between the gearbox and the rear axle in a longitudinal direction of the vehicle. Further, the at least one propulsion unit is positioned in parallel with the gearbox output shaft and the propeller shaft. In front of the transmission, and thus in front of the powertrain a space is created when the at least one propulsion unit is arranged in a position between the transmission and the rear axle. The definition of the longitudinal direction of the vehicle, is a direction from the front part of the vehicle to the rear part of the vehicle. The created space in front of the transmission, and thus in front of the powertrain, may accommodate energy storage units for storing electrical power. The created space may alternatively, or in combination, accommodate energy storage units for liquid fuel, such as diesel fuel or petrol.

The created space for accommodating energy storage units increases the storage and the capacity of electrical power and/or liquid fuel for propulsion of the propulsion units, and thus increases the operation range of the vehicle. The created space in the vehicle may accommodate a large energy storage unit or a number of small energy storage units.

Vehicle components such as shafts, frames, and components in the powertrain will be arranged outside the created space for the energy storage units. Thus, by arranging the at least one propulsion unit in a position between the transmission and the rear axle in the longitudinal direction of the vehicle will create an essential space in front of the powertrain. Further, when arranging the powertrain rearwards in the vehicle in a direction towards rear axle of the vehicle, the created space in front of the powertrain will be even larger.

According to an example, the at least one propulsion unit and the propeller shaft are connected in parallel to the transmission.

The input shaft of the transmission is connected to the at least one propulsion unit. The output shaft of the transmission is connected to the propeller shaft. The input shaft and the output shaft of the transmission have a parallel extension in relation to each other. The input shaft and the output shaft of the transmission extend in the same direction. When the transmission is arranged in the vehicle, the input shaft and the output shaft of the transmission extend in a direction towards the rear axle and the rear part of the vehicle. Connecting the at least one propulsion unit and the propeller shaft in parallel to the transmission will result in a compact powertrain and a large space in front of the transmission for accommodating energy storage units. The axis of the propeller shaft may be directed in different angels in relation to an axis of the output shaft of the transmission.

According to an example, a center axis of the propeller shaft extends in an angle in relation to a center axis of an output shaft of the transmission to which the propeller shaft is connected.

The propeller shaft is connected to the output shaft of the transmission. The input shaft and the output shaft of the transmission have a parallel extension in relation to each other. However, depending on the vehicle configuration the center axis of the propeller shaft may extend in an angle in relation to the center axis of the output shaft of the transmission.

According to an example, the axial extension of the powertrain in the longitudinal direction of the vehicle, from the connection between the propeller shaft and the drive shaft, corresponds to the common extension of the propeller shaft and the transmission in the longitudinal direction of the vehicle.

The length of the powertrain, from the point of connection between the propeller shaft and the drive shaft of the rear axis, is the common extension of the propeller shaft and the transmission in the longitudinal direction of the vehicle. Thus, the length of the propeller shaft and the length or the longitudinal packaging volume of the transmission will define the extension of the powertrain in front of the rear axle. A short propeller shaft and/or a short or more compact transmission, will create a large space in front of the powertrain for accommodating energy storage units.

According to an example, the axial extension of the transmission in the longitudinal direction of the vehicle is less than 20% of the common axial extension of the propeller shaft and the transmission in the longitudinal direction of the vehicle.

When the transmission has an axial extension, a length or a thickness, which is less than 20% of the common axial extension of the propeller shaft and the transmission in the longitudinal direction of the vehicle a compact powertrain is achieved. The limited length or a thickness of the transmission will limit the extension of the powertrain in front of the rear axle. As a result, a large space in front of the powertrain is created for accommodating energy storage units.

According to an example, the axial extension of the transmission in the longitudinal direction of the vehicle is less than 10% of the common axial extension of the propeller shaft and the transmission in the longitudinal direction of the vehicle.

When the transmission has an axial extension, a length or a thickness, which is less than 10% of the common axial extension of the propeller shaft and the transmission in the longitudinal direction of the vehicle a compact powertrain is achieved. The limited length or a thickness of the transmission will limit the extension of the powertrain in front of the rear axle. The transmission having an axial extension less than 10% of the common axial extension of the propeller shaft and the transmission may create a larger space in front of the powertrain than a transmission having an axial extension less than 20% of the common axial extension of the propeller shaft and the transmission. Therefore, such transmission having an axial extension less than 10% of the common axial extension of the propeller shaft and the transmission will create an even larger space in front of the powertrain for accommodating energy storage units.

According to an example, the at least one propulsion unit is an electrical machine.

The powertrain may use only electrical machines as a propulsion unit. The propulsion unit may comprise a large electrical machine provided with enough torque and power for propelling the vehicle. Alternatively, a number of propulsion units may be arranged in the powertrain, comprising a number of small electrical machines, which together are provided with enough torque and power for propelling the vehicle. The storage and the capacity of electrical power for propulsion of the electrical machines will increase the operation range of the vehicle due to the larger accommodation capacity of the energy storage units.

According to an example, the powertrain comprises at least two propulsion units, wherein the at least two propulsion units comprises at least one electrical machine and an internal combustion engine.

An electrical machine may be combined with an internal combustion engine in the powertrain. It is also possible to combine one or several electrical machines with an internal combustion engine in the powertrain. Such combination may allow the electrical machines and the internal combustion engine to work independently of each other or to work in combination as a hybrid drive. The electrical machine is connected to a first input shaft of the transmission and the internal combustion engine is connected to a second input shaft of the transmission. The storage and the capacity of electrical power and fluid fuel for propulsion of the electrical machines and the internal combustion engine will increase the operation range of the vehicle due to the larger accommodation capacity of the energy storage units in the created space in front of the powertrain.

According to an example, the electrical machine and the internal combustion engine are arranged in a position between the transmission and the rear axle and parallel to each other.

The electrical machine and the internal combustion engine are arranged in a position between the transmission and the rear axle in a longitudinal direction of the vehicle. In front of the transmission, and thus in front of the powertrain a space is created when the electrical machine and the internal combustion engine are arranged in a position between the transmission and the rear axle. The created space in front of the transmission, and thus in front of the powertrain, may accommodate energy storage units for storing electrical power and liquid fuel, such as diesel fuel or petrol. The electrical machine is connected to a first input shaft of the transmission and the internal combustion engine is connected to a second input shaft of the transmission. The first and second input shafts of the transmission are arranged in parallel to each other, so that they have a parallel extension in relation to each other. The first and second input shafts of the transmission extend in the same direction. When the transmission is arranged in the vehicle, the first and second input shafts of the transmission in a direction towards the rear axle and the rear part of the vehicle. Connecting the electrical machine and the internal combustion engine in parallel to each other will result in a compact powertrain and a large space in front of the transmission for accommodating energy storage units.

According to an example, the propeller shaft is connected to the transmission and to the at least one drive shaft by means of universal joints, so that the propeller shaft is allowed to change its direction of axial extension, when the rear axle moves in a vertical direction.

The length of a propeller shaft of the powertrain will be enough for handle maximum allowable angles both in normal driving position and at rear axle movements. Also joint angles between the propeller shaft and the transmission, and between the propeller shaft and the drive shaft, will fall within allowable angels for universal joints. The powertrain may be arranged rearwards in the vehicle in a direction towards rear axle of the vehicle as far as the length of a propeller shaft will be enough for handle the maximum allowable angles. Arranging the powertrain as far as possible towards the rear axle will create an even larger space in front of the powertrain for accommodating energy storage units.

According to an example, the propeller shaft is telescopically configured, allowing the length of the propeller shaft to vary when the rear axle moves in a perpendicular direction in relation to the longitudinal direction of the vehicle.

When the rear axle moves in a perpendicular direction in relation to the longitudinal direction of the vehicle and the position of the transmission is fixed, the distance between the rear axle and the transmission will change. Since the propeller shaft is connected to the transmission in a first end and connected to the drive shaft of the rear axle with the second end, the length of the propeller will change by means of the telescopic configuration when the rear axle moves in a perpendicular direction in relation to the longitudinal direction of the vehicle. The powertrain may be arranged rearwards in the vehicle in a direction towards rear axle of the vehicle as far as the length of a propeller shaft will accept the telescopically configuration. Arranging the powertrain as far as possible towards the rear axle will create an even larger space in front of the powertrain for accommodating energy storage units.

According to the present disclosure, a vehicle is provided. The vehicle, comprising the powertrain disclosed herein. A vehicle provided with such a powertrain will have an increased the operation range due to the extended storing capacity of electrical power and/or fuel in the space created in front of the powertrain in the vehicle.

According to an example, an energy storage unit is arranged in front of the powertrain in the vehicle. The created space in front of the powertrain in the vehicle will accommodate an energy storage unit depending on the type of propulsion unit.

The present disclosure will now, according to an example, be further illustrated with reference to the appended figures.

FIG. 1 schematically illustrates a side view of a vehicle 1 with a powertrain 2 according to an example. The powertrain 2 comprising a propulsion unit 4, a transmission 6 connected to the at least one propulsion unit 4 and a propeller shaft 8 connected to the transmission 6, and at least one drive shaft 10 of a rear axle 12. The at least one drive shaft 10 is connected to the propeller shaft 8, so that the propeller shaft 8 extends between the transmission 6 and the at least one drive shaft 10. The at least one propulsion unit 4 is arranged in a position between the transmission 6 and the rear axle 12 in a longitudinal direction of the vehicle 1. An energy storage unit 14 is arranged in front of the powertrain 2. The energy storage unit 14 is connected to the propulsion unit 4 and deliver power to the propulsion unit 4. A number of propulsion units 4 may be arranged in series. The vehicle 1 comprises rear drive wheels 16 and front wheels 18.

Figure 2:
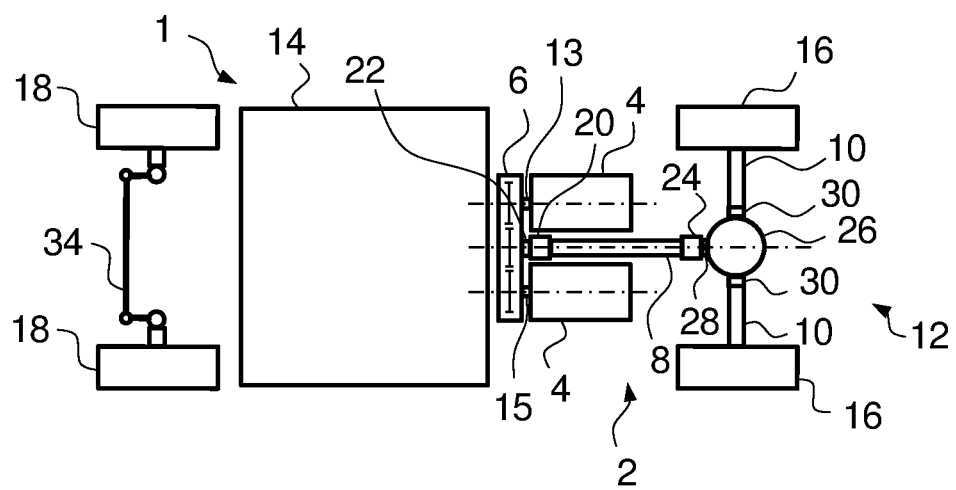
FIG. 2 schematically illustrates a view from above of a powertrain according to an example.

FIG. 2 schematically illustrates a view from above of a powertrain 2 according to an example. Two propulsion units 4 are arranged in the powertrain 2. The propulsion units 4 may be electrical machines, which together provide torque and power for propelling the vehicle 1. According to an example, one propulsion unit 4 may be an electrical machine and the other propulsion unit 4 may be an internal combustion engine. The electrical machine and the internal combustion engine are arranged in a position between the transmission 6 and the rear axle 12 and parallel to each other. A first input shaft 13 of the transmission 6 is connected to one propulsion unit 4. A second input shaft 15 of the transmission 6 is connected to the other propulsion unit 4. The propeller shaft 8 is with a first end 20 connected to an output shaft 22 of the transmission 6 and with a second end 24 connected to the drive shafts 10 of the rear axle 12. The second end 24 of the propeller shaft 8 may be connected to the drive shafts 10 via a differential gear 26, which is arranged in the rear axle 12. The differential gear 26 comprises an input shaft 28, which is connected to the propeller shaft 8, and two output shafts 30, each connected to a drive shaft 10. Each drive shaft 10 is connected to a drive wheel 16, for driving the vehicle 1. An energy storage unit 14 is arranged in front of the powertrain 2. The front wheels 18 of the vehicle 1 are steerable by means of a linkage mechanism 32. The propulsion units 4 and the propeller shaft 8 are connected in parallel to the transmission 6. The axial extension of the power train 2 in the longitudinal direction of the vehicle 1, from the connection between the propeller shaft 8 and the drive shaft 10, corresponds to the common axial extension of the propeller shaft 8 and the transmission in the longitudinal direction of the vehicle 1. The axial extension of the transmission 6 in the longitudinal direction of the vehicle 1 is less than 20% of the common axial extension of the propeller shaft 8 and the transmission 6 in the longitudinal direction of the vehicle 1. According to another example, the axial extension of the transmission 6 in the longitudinal direction of the vehicle 1 my be less than 10% of the common axial extension of the propeller shaft 8 and the transmission 6 in the longitudinal direction of the vehicle 1.

Figure 3A:
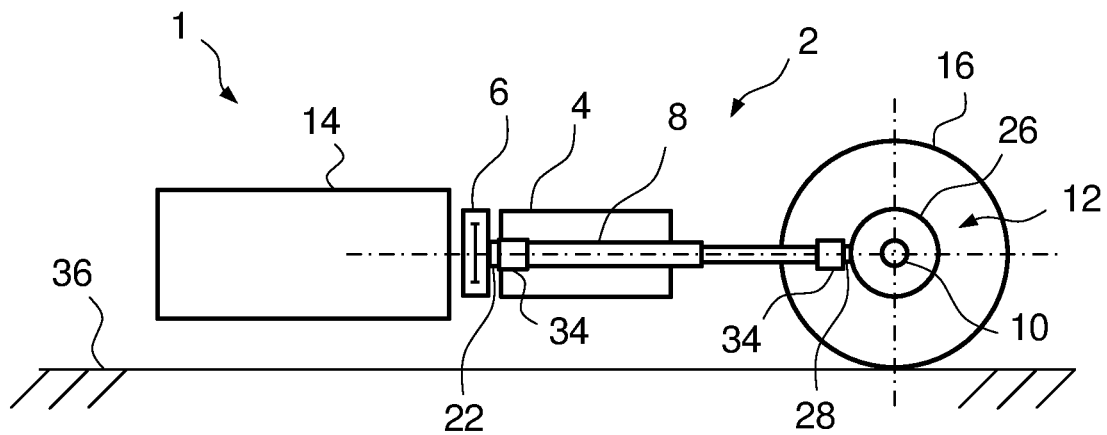
FIGS. 3a-3c schematically illustrate side views of a powertrain according to an example.
Figure 3B:
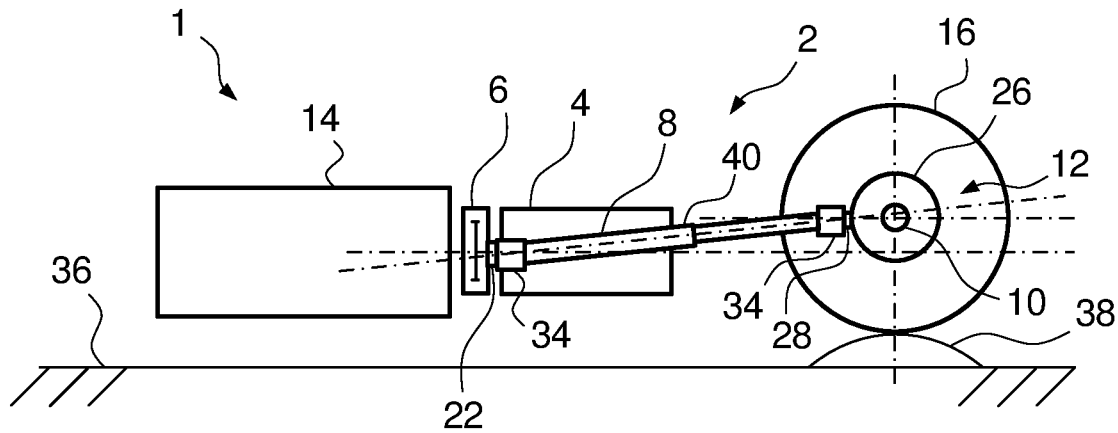
Figure 3C:
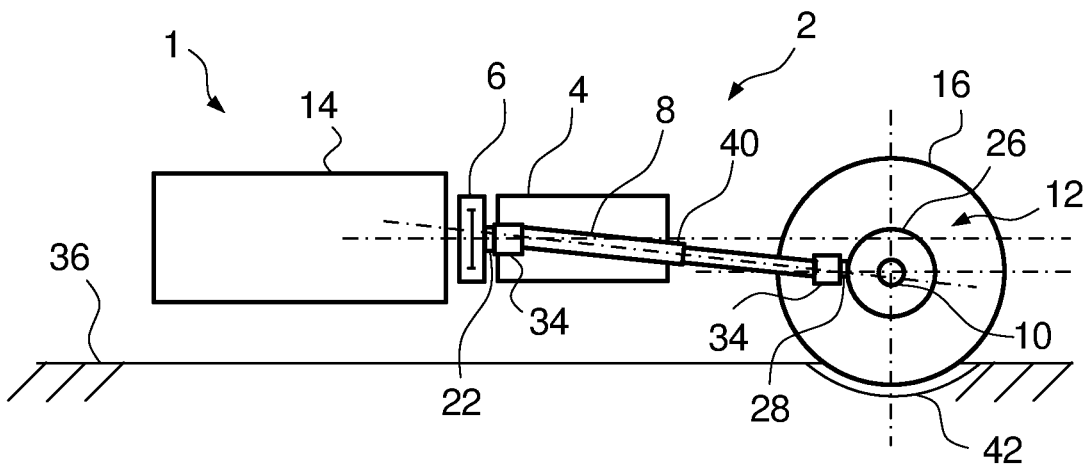

FIGS. 3a-3c schematically illustrate side views of a powertrain 2 according to an example. The length of the propeller shaft 8 will handle maximum allowable angles both in normal driving position and at movements of the rear axle 12. The length of the propeller shaft 8 will also handle different vehicle 1 heights. The connections between the propeller shaft 8 and the transmission 6 and the drive shafts 10 are accomplished by means of universal joints 34. Also angles between the propeller shaft 8 and the transmission 6 and the drive shaft 10 will fall within allowable angels for the universal joints 34. In FIG. 3a the powertrain 2 is shown in a normal driving position in which the extension of the propeller shaft 8, the output shaft 22 of the transmission 6 and the input shaft 28 of the differential gear 26 coincides and follow a common line. Such a normal driving position will take place when the vehicle 1 is driving on a smooth or uniform road 36. In FIG. 3*b* the powertrain 2 is shown in a driving position in which the drive wheels 16 are on the top of a bump 38 or a protrusion in the road 36. Thus, the drive wheels 16 and the rear axle 12 has moved in a vertical direction upwards in relation to the longitudinal direction of the vehicle 1. In such situation there will be an angle between the extension of the propeller shaft 8, the output shaft 22 of the transmission 6 and the input shaft 28 of the differential gear 26. When the rear axle 12 moves in a vertical or perpendicular direction in relation to the longitudinal direction of the vehicle 1 and the position of the transmission 6 is fixed, the distance between the rear axle 12 and the transmission 6 will change. Since the propeller shaft 8 is connected to the transmission 6 at its first end 22 and connected to the drive shaft 10 of the rear axle 12 with its second end 24, the length of the propeller shaft 8 will change by means of a telescopic configuration 40 when the rear axle 12 moves in a perpendicular direction in relation to the longitudinal direction of the vehicle 1. In FIG. 3*c* the powertrain 2 is shown in a driving position in which the driving wheels 16 are in a cavity 42 in the road. Thus, the drive wheels 16 and the rear axle 12 has moved in a vertical direction downwards in relation to the longitudinal direction of the vehicle 1. In such situation there will be an angle between the extension of the propeller shaft 8, the output shaft 22 of the transmission 6 and the input shaft 28 of the differential gear 26.

Figure 4:
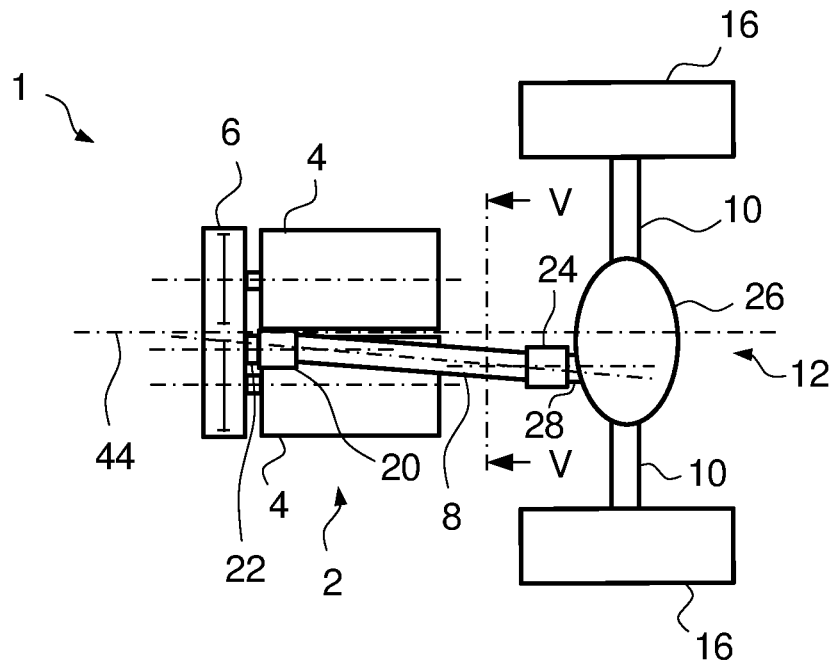
FIG. 4 schematically illustrates a view from below of a powertrain according to an example.

FIG. 4 schematically illustrates a view from below of a powertrain 2 according to an example. The propeller shaft 8 is with the first end 20 connected to the output shaft 22 of the transmission 6 and with the second end connected to the drive shafts 10 of the rear axle 12. The second end 24 of the propeller shaft 8 is connected to the drive shafts 10 via the differential gear 26. The input shaft 28 of the differential gear 26 is arranged beside a center line 44, which passing symmetrically between the drive wheels 16 and symmetrically and longitudinally through the vehicle 1. For this reason the propeller shaft 8 will extend beside the center line 44 that pass symmetrically and longitudinally through the vehicle 1. The input shaft 13 and the output shaft 22 of the transmission 6 have a parallel extension in relation to each other. The center axis of the propeller shaft 8 extends in an angle in relation to the center axis of the output shaft 22 of the transmission 6.

Figure 5:
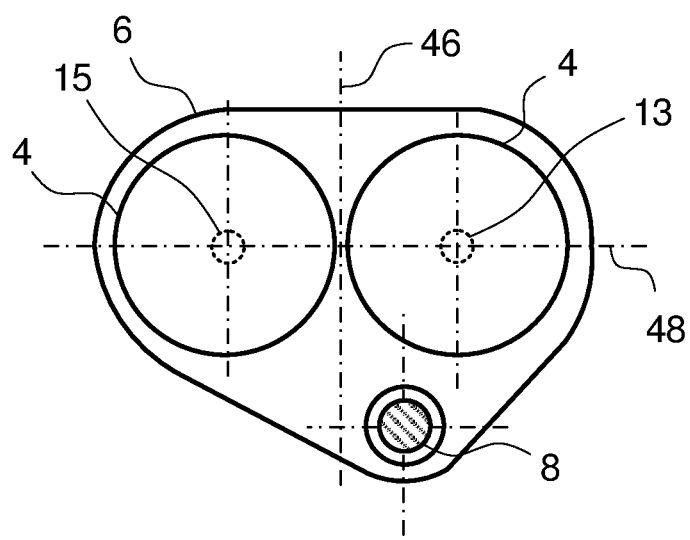
FIG. 5 schematically illustrates a section view along line V-V in FIG. 4 according to an example.

FIG. 5 schematically illustrates a section view along line V-V in FIG. 4 according to an example. The propeller shaft 8 extends beside a symmetrical line 46 that pass between the propulsion units 4. In addition, the output shaft 22 of the transmission 6 and thus the propeller shaft 8 is positioned a distance from a common center line 48 that pass through the input shafts 13, 15 of the transmission 6, and thus of the propulsion units 4. With this configuration, the propulsion units 4 can be arranged close to each other, so that the transmission requires less space in the vehicle 1.

The foregoing description of the examples has been furnished for illustrative and descriptive purposes. It is not intended to be exhaustive, or to limit the examples to the variants described. Many modifications and variations will obviously be apparent to one skilled in the art. The examples have been chosen and described in order to best explicate principles and practical applications, and to thereby enable one skilled in the art to understand the examples in terms of its various examples and with the various modifications that are applicable to its intended use. The components and features specified above may, within the framework of the examples, be combined between different examples specified.

The invention claimed is:

1. A powertrain for a vehicle, the powertrain comprising:
at least one propulsion unit;
a transmission connected to the at least one propulsion unit;
a propeller shaft connected to the transmission; and
at least one drive shaft of a rear axle, which at least one drive shaft is connected to the propeller shaft, so that the propeller shaft extends between the transmission and the at least one drive shaft,
wherein the at least one propulsion unit is arranged in a position between the transmission and the rear axle in a longitudinal direction of the vehicle, and
wherein an axial extension of the power train in a longitudinal direction of the vehicle, from the connection between the propeller shaft and the least one drive shaft, is confined to only a common axial extension of the propeller shaft and the transmission in the longitudinal direction of the vehicle.

2. The powertrain according to claim 1, wherein the at least one propulsion unit and the propeller shaft are connected in parallel to the transmission.

3. The powertrain according to claim 2, wherein a center axis of the propeller shaft extends at an angle in relation to a center axis of an output shaft of the transmission to which the propeller shaft is connected.

4. The powertrain according to claim 1, wherein the axial extension of the transmission in the longitudinal direction of the vehicle is less than 20% of the common axial extension of the propeller shaft and the transmission in the longitudinal direction of the vehicle.

5. The powertrain according to claim 4, wherein the axial extension of the transmission in the longitudinal direction of the vehicle is less than 10% of the common axial extension of the propeller shaft and the transmission in the longitudinal direction of the vehicle.

6. The powertrain according to claim 1, wherein the at least one propulsion unit is an electrical machine.

7. The powertrain according to claim 1, wherein the powertrain comprises at least two propulsion units, wherein the at least two propulsion units comprises at least one electrical machine and an internal combustion engine.

8. The powertrain according to claim 7, wherein the electrical machine and the internal combustion engine are arranged in a position between the transmission and the rear axle and are parallel to each other.

9. The powertrain according to claim 1, wherein the propeller shaft is connected to the transmission and to the at least one drive shaft by means of universal joints, so that the propeller shaft is allowed to change its direction of axial extension, when the rear axle moves in a vertical direction.

10. The powertrain according to claim 1, wherein the propeller shaft is telescopically configured, allowing the length of the propeller shaft to vary when the rear axle moves in a perpendicular direction in relation to the longitudinal direction of the vehicle.

11. A vehicle, comprising a powertrain, which, in turn, comprises:
at least one propulsion unit;
a transmission connected to the at least one propulsion unit;
a propeller shaft connected to the transmission; and
at least one drive shaft of a rear axle, which at least one drive shaft is connected to the propeller shaft, so that the propeller shaft extends between the transmission and the at least one drive shaft, wherein the at least one propulsion unit is arranged in a position between the transmission and the rear axle in a longitudinal direction of the vehicle, wherein an axial extension of the power train in a longitudinal direction of the vehicle, from the connection between the propeller shaft and the least one drive shaft, is confined to only a common axial extension of the propeller shaft and the transmission in the longitudinal direction of the vehicle.

12. The vehicle according to claim 11, wherein an energy storage unit is arranged in front of the powertrain in the vehicle.

13. The powertrain according to claim 11, wherein the at least one propulsion unit and the propeller shaft are connected in parallel to the transmission.

14. The powertrain according to claim 13, wherein a center axis of the propeller shaft extends at an angle in relation to a center axis of an output shaft of the transmission to which the propeller shaft is connected.

15. The powertrain according to claim 11, wherein the axial extension of the transmission in the longitudinal direction of the vehicle is less than 20% of the common axial extension of the propeller shaft and the transmission in the longitudinal direction of the vehicle.

16. The powertrain according to claim 15, wherein the axial extension of the transmission in the longitudinal direction of the vehicle is less than 10% of the common axial extension of the propeller shaft and the transmission in the longitudinal direction of the vehicle.

17. The powertrain according to claim 11, wherein the powertrain comprises at least two propulsion units, wherein the at least two propulsion units comprises at least one electrical machine and an internal combustion engine.

18. The powertrain according to claim 17, wherein the electrical machine and the internal combustion engine are arranged in a position between the transmission and the rear axle and parallel to each other.

19. The powertrain according to claim 11, wherein the propeller shaft is connected to the transmission and to the at least one drive shaft by means of universal joints, so that the propeller shaft is allowed to change its direction of axial extension, when the rear axle moves in a vertical direction.

20. The powertrain according to claim 11, wherein the propeller shaft is telescopically configured, allowing the length of the propeller shaft to vary when the rear axle moves in a perpendicular direction in relation to the longitudinal direction of the vehicle.

21. A powertrain for a vehicle, the powertrain comprising:
at least one propulsion unit;
a transmission connected to the at least one propulsion unit;
a propeller shaft connected to the transmission; at least two propulsion units, wherein the at least two propulsion units comprises at least one electrical machine and an internal combustion engine; and
at least one drive shaft of a rear axle, which at least one drive shaft is connected to the propeller shaft, so that the propeller shaft extends between the transmission and the at least one drive shaft,
wherein the at least one propulsion unit is arranged in a position between the transmission and the rear axle in a longitudinal direction of the vehicle,
wherein an axial extension of the power train in a longitudinal direction of the vehicle, from the connection between the propeller shaft and the least one drive shaft, corresponds to a common axial extension of the propeller shaft and the transmission in the longitudinal direction of the vehicle, and
wherein the at least one electric machine and the internal combustion engine are arranged in a position between the transmission and the rear axle and are parallel to each other.

* * * * *